(12) United States Patent
Uehara et al.

(10) Patent No.: US 6,321,772 B1
(45) Date of Patent: Nov. 27, 2001

(54) VACUUM PRESSURE-ADJUSTING APPARATUS

(75) Inventors: Teruo Uehara, Ibaraki-ken; Takashi Shirane, Toride; Naoki Iguma, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,003

(22) Filed: Mar. 20, 2000

(30) Foreign Application Priority Data

Mar. 23, 1999 (JP) ................................................ 11-078590

(51) Int. Cl.$^7$ ................................................ G05D 16/02
(52) U.S. Cl. .................. 137/112; 137/114; 137/505.13; 137/907
(58) Field of Search ............................ 137/505.13, 112, 137/114, 116.5, 907

(56) References Cited

U.S. PATENT DOCUMENTS 3,766,933 * 10/1973 Nicholson, Jr. .................. 137/116.3
4,291,717 * 9/1981 Orcutt .............................. 137/907 X

FOREIGN PATENT DOCUMENTS

2109597 * 9/1972 (DE) ...................................... 137/907
07-295655 A 11/1995 (JP) .

* cited by examiner

*Primary Examiner*—Stephen M. Hepperle
(74) *Attorney, Agent, or Firm*—Paul A. Guss

(57) ABSTRACT

The air (atmospheric air) is introduced from an atmospheric port, and it is throttled to give a minute amount by means of a bleed hole. The air is introduced into a vacuum chamber via a bleed passage, and it is introduced into a pressure regulator port via a feedback passage. Further, the air is allowed to pass through a space between a seat section and a seal member of a valve plug, and it is drawn toward a vacuum port. Thus, the seal member of the valve plug to be seated on the seat section is prevented from biting into the seat section.

7 Claims, 5 Drawing Sheets

F I G. 5
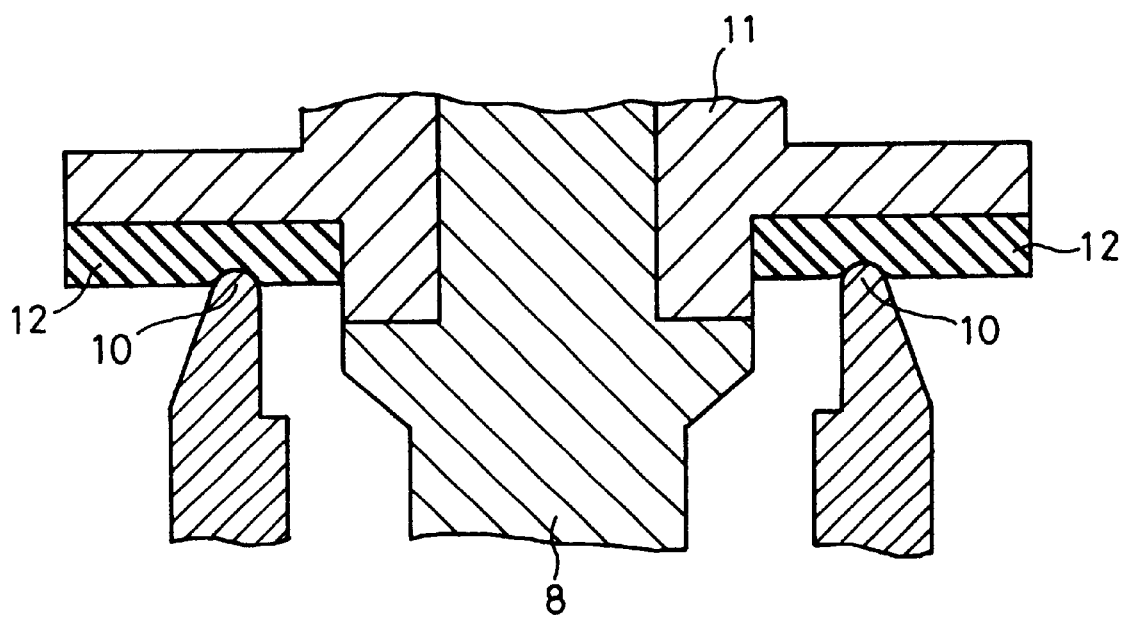
PRIOR ART

VACUUM PRESSURE-ADJUSTING APPARATUS

BACKGROUND OF THE INVENTION

1. Field of the Invention

The present invention relates to a vacuum pressure-adjusting apparatus capable of supplying an adjusted predetermined vacuum pressure to a fluid pressure-operated apparatus which is operated by the vacuum pressure.

2. Description of the Related Art

A process has been hitherto carried out, in which a workpiece is sucked and transported, for example, by using a suction means such as a suction pad in accordance with an action of the vacuum pressure. When the vacuum pressure is supplied from a vacuum pump to the suction pad, a vacuum pressure-adjusting apparatus such as a vacuum regulator is provided between the vacuum pump and the suction pad, for adjusting the vacuum pressure from the vacuum pump to have a predetermined value so that the vacuum pressure is supplied to the suction pad.

Such a vacuum regulator concerning the conventional technique is shown in FIG. 4 (see Japanese Laid-Open Patent Publication No. 7-295655).

The vacuum regulator 1 comprises a housing 6 formed with a vacuum port 3 which is connected to a vacuum pressure supply source 2 such as a vacuum pump, and a pressure regulator port 5 which is connected to a vacuum pressure-operated apparatus 4 such as a suction pad.

A hole 7, which extends in the axial direction, is formed at a central portion in the housing 6. A valve stem 8 is provided slidably in the hole 7. A valve plug 11, which is urged by a spring force of a first compressive coil spring 9 to seat on a valve seat 10, is coupled to the valve stem 8. A seal member 12, which is composed of an elastic member such as rubber to make abutment against the valve seat 10, is secured to the valve plug 11. In this arrangement, the valve plug 11 is urged by the spring force of the first compressive coil spring 9 so that the valve-closed state is always given. The seal member 12, which is composed of the elastic member, is seated on the valve seat in a state of biting into the valve seat 10 which is composed of an annular projection (see FIG. 5).

An atmospheric chamber 14 which communicates with the outside via a communication hole 13, and a vacuum chamber 16 which communicates with the pressure regulator port 5 via a bypass hole 15 are formed and comparted by a diaphragm 17 in the housing 6.

A communication port 19, which is opened and closed by the valve stem 8, is formed in an interlocking disk 18 which is displaceable integrally with the diaphragm 17. A second compressive coil spring 20, which has a spring force to urge the valve plug 11 in a direction to make separation from the valve seat 10, is arranged at the inside of the housing 6. The second compressive coil spring 20 is designed such that the spring force thereof is adjusted by a handle 21.

In this arrangement, the vacuum pressure of the pressure regulator port 5 is set by the second compressive coil spring 20. When the vacuum pressure is not more than a predetermined pressure, the atmospheric air is supplied via the communication port 19 to the pressure regulator port 5.

However, the vacuum regulator 1 concerning the conventional technique described above involves the following inconvenience. That is, when the valve plug 11 is in the valve-closed state, the seal member 12 of the valve plug 11 is in the state of biting into the valve seat 10 by the aid of the spring force of the first compressive coil spring 9. Therefore, even when the handle 21 is operated and rotated to finely adjust the predetermined vacuum pressure, the response sensitivity is blunt, because of the following reason.

That is, when a predetermined vacuum pressure is reset to another finely adjusted vacuum pressure, it is necessary that the valve plug 11 is reliably separated from the valve seat 10 to give the valve-open state, and the vacuum port 3 is communicated with the pressure regulator port 5 to change the vacuum pressure supplied from the pressure regulator port 5. In order to give the valve-open state of the valve plug 11, it is necessary that the valve plug 11 is firstly displaced slightly in an amount of the biting of the seal member 12 into the valve seat 10, and then the seal member 12 of the valve plug 11 is separated from the valve seat 10 to form a predetermined clearance. However, in the case of the vacuum regulator 1 concerning the conventional technique, a so-called dead zone appears, in which the vacuum pressure is not changed even when the valve plug 11 is slightly displaced in the amount of the biting of the seal member 12 into the valve seat 10. For this reason, it takes a long time until the vacuum pressure begins to change, and the response speed is slow.

Further, the vacuum regulator 1 concerning the conventional technique involves the following inconvenience. That is, when a predetermined vacuum pressure is finely adjusted, and it is reset to another vacuum pressure, then the setting accuracy of the reset vacuum pressure is inferior, and the setting operation is time-consuming and complicated, because the dead zone appears as described above.

SUMMARY OF THE INVENTION

A general object of the present invention is to provide a vacuum pressure-adjusting apparatus which makes it possible to improve the response sensitivity and the setting accuracy by decreasing the dead zone.

A principal object of the present invention is to provide a vacuum pressure-adjusting apparatus which makes it possible to conveniently perform the setting operation for the vacuum pressure when a predetermined vacuum pressure is finely adjusted, and it is reset to another vacuum pressure.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 shows a partial magnified vertical sectional view illustrating a state in which a valve plug shown in FIG. 4 is seated on a valve seat.

DESCRIPTION OF THE PREFERRED EMBODIMENTS

Figure 1:
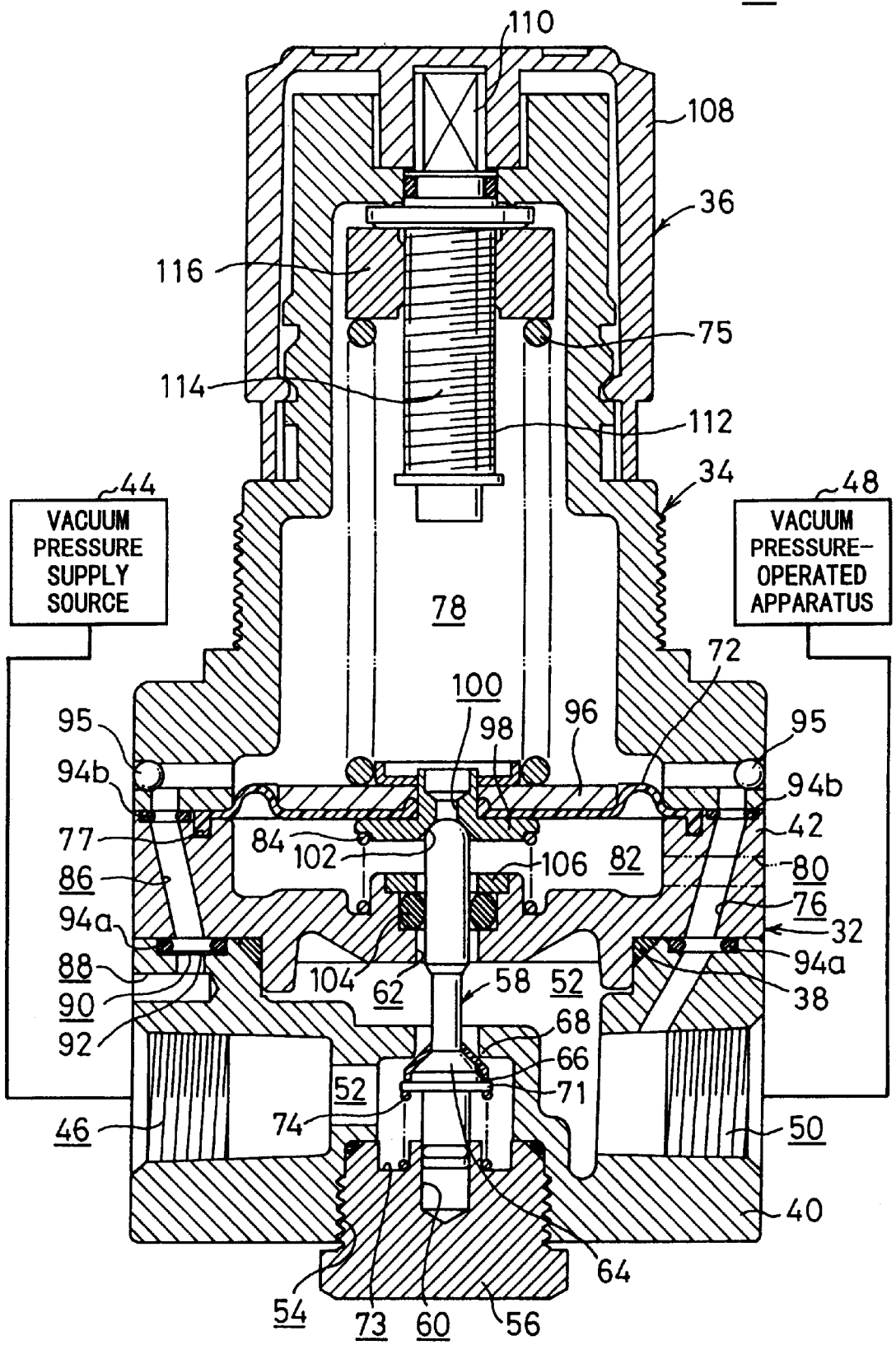
FIG. 1 shows a vertical sectional view taken in an axial direction illustrating a vacuum regulator according to an embodiment of the present invention.

With reference to FIG. 1, reference numeral 30 indicates a vacuum regulator according to an embodiment of the present invention.

The vacuum regulator 30 basically comprises a body section 32 which has a substantially rectangular parallelepiped-shaped configuration, a bonnet 34 which is integrally coupled to an upper portion of the body section 32, and an operating section 36 which is provided rotatably on the upper side of the bonnet 34. The body section 32 and the bonnet 34 function as a housing.

The body section 32 has a first body 40 and a second body 42 which are stacked in an integrated manner with a ring-shaped seal member 38 intervening therebetween. A vacuum port 46 to be connected to a vacuum pressure supply source 44, and a pressure regulator port 50 to be connected to a vacuum pressure-operated apparatus 48 such as a suction pad are formed substantially coaxially on mutually opposing both sides of the of the first body 40 such that they are separated from each other by a predetermined spacing distance. A communication passage 52 for making communication between the vacuum port 46 and the pressure regulator port 50 is formed between the vacuum port 46 and the pressure regulator port 50.

A closing member 56 for closing a hole 54 formed at the bottom surface is screwed into the first body 40. A guide hole 60 for allowing the end of a valve plug 58 to make sliding movement is formed on the closing member 56 as described later on.

A hole 62, which extends in the axial direction, is formed at a substantially central portion of the body section 32. The valve plug 58 is provided displaceably along the hole 62. A bevel section 64, which has its diameter gradually increasing toward the lower side, is formed at an intermediate portion of the valve plug 58. A seal member 66, which is composed of, for example, an elastic member such as rubber, is secured to an inclined surface of the bevel section 64. A seat section 68, which is composed of an annular projection, is formed at a substantially central portion of the first body 40. The communication passage 52 is blocked by the seal member 66 of the valve plug 58 seated on the seat section 68.

A ring member 71 is fitted to the valve plug 58 in the vicinity of the bevel section 64. A first spring member 74 is fastened between the ring member 71 and an annular recess 73 of the closing member 56. The valve plug 58 is urged so that the seal member 66 of the valve plug 58 is seated on the seat section 68 to always give the valve-closed state by the aid of the spring force of the first spring member 74.

A diaphragm 72 is interposed between the body section 32 and the bonnet 34 with a second spring member 75 for urging the valve plug 58 in a direction to make separation from the seat section 68. An expanded circumferential edge 77 of the diaphragm 72 is interposed by an annular recess formed on the second body 42 and the wall surface of the bonnet 34. A vacuum chamber 78, which is closed by the bonnet 34 and which communicates with the pressure regulator port 50 via a feedback passage 76, is provided on the upper side of the diaphragm 72. An atmospheric chamber 82, which communicates with the atmospheric air via a passage 80, is provided on the lower side of the diaphragm 72. Therefore, the internal space, which is closed by the second body 42 and the bonnet 34, is formed and comparted into the upper vacuum chamber 78 and the lower atmospheric chamber 82 with the diaphragm 72 intervening therebetween. A third spring member 84 for pressing the diaphragm 72 upwardly is arranged in the atmospheric chamber 82.

Figure 2:
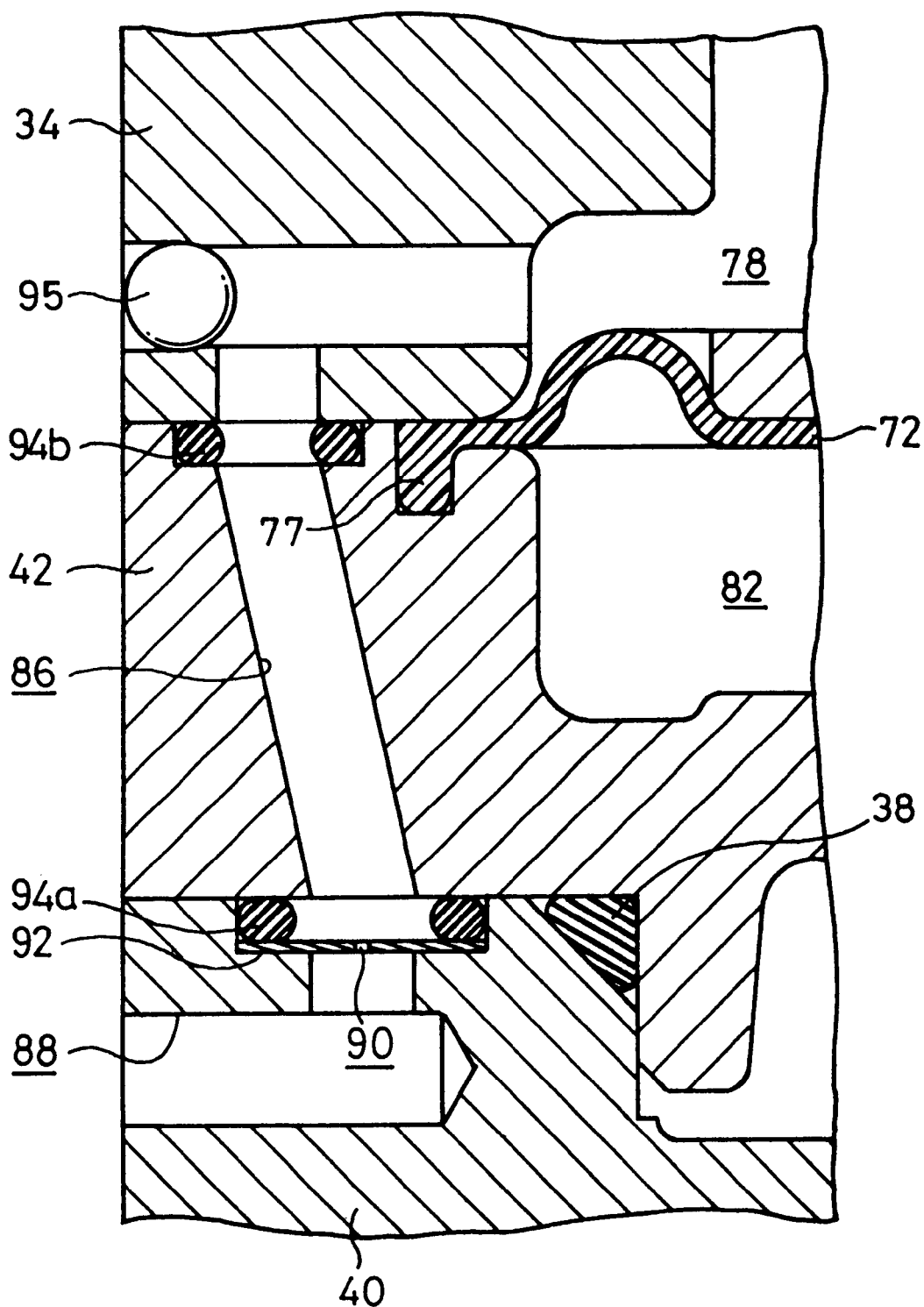
FIG. 2 shows, with partial omission, a magnified vertical sectional view illustrating a bleed passage provided in the vacuum regulator shown in FIG. 1.

In this embodiment, the vacuum chamber 78 is provided to make communication with an atmospheric port 88 via a bleed passage 86 formed in the body section 32, and make communication with the pressure regulator port 50 via the feedback passage 76. As shown in FIG. 2, a throttle member 92, which is formed with a bleed hole (throttle hole) 90 having a minute diameter, is provided on the lower side of the bleed passage 86. The intake amount of the atmospheric air flowing from the atmospheric port 88 into the vacuum chamber 78 is throttled by the bleed hole 90. Reference numerals 94a, 94b indicate seal rings installed in the bleed passage 86 and the feedback passage 76 respectively. Reference numeral 95 indicates a ball-shaped plug member for holding the bleed passage 86 and the feedback passage 76 in an air-tight manner.

As shown in FIG. 1, the diaphragm 72 is provided with a pair of disk members 96, 98 for interposing a central portion of the diaphragm 72 between the upper surface side and the lower surface side. A communication port 100, which is composed of a communication hole for making communication between the vacuum chamber 78 and the atmospheric chamber 82, is formed through the lower surface side disk member 98. The communication port 100 is closed by the first end of the valve plug 58 seated on a seat section 102 of the disk member 98. The communication port 100 is opened when the first end of the valve plug 58 is separated from the seat section 102.

Reference numeral 104 indicates a seal member for holding the atmospheric chamber 82 in an air-tight manner by surrounding the outer circumference of the valve plug 58. Reference numeral 106 indicates a ring member for fastening the seal member 104.

As shown in FIG. 1, the operating section 36 includes a handle 108 which is provided rotatably on an upper portion of the bonnet 34 and which is used to set the vacuum pressure, a shaft member 114 which has a first end 110 with a rectangular cross section to be fitted to a hole with a rectangular cross section of the handle 108 and which has a thread section 112 formed on the outer circumferential surface, and a spring support member 116 which is meshed with the thread section 112 in accordance with the rotating action of the handle 108 and which is displaceable in the axial direction of the shaft member 114.

The vacuum regulator 30 according to the embodiment of the present invention is basically constructed as described above. Next, its operation, function, and effect will be explained.

At first, as shown in FIG. 1, the vacuum pressure supply source 44 is connected to the vacuum port 46 via a tube or the like. On the other hand, for example, the vacuum pressure-operated apparatus 48 such as a suction pad is connected beforehand to the pressure regulator port 50.

After completing the preparatory operation as described above, the handle 108 is rotated in a predetermined direction. Accordingly, the diaphragm 72 is pressed downwardly by the spring force of the second spring member 75 in accordance with the displacement action of the spring support member 116 which is meshed with the shaft member 114. The diaphragm 72 and the valve plug 58 are displaced downwardly in an integrated manner, and the valve plug 58 is separated from the seat section 68. Thus, the communication passage 52 is opened, and the vacuum port 46 is communicated with the pressure regulator port 50.

As a result, the vacuum pressure, which is regulated in accordance with the pressure-regulating action of the diaphragm 72, is stably supplied to the vacuum pressure-operated apparatus 48 connected to the pressure regulator port 50.

The vacuum pressure, which is supplied from the pressure regulator port 50 to the vacuum pressure-operated apparatus 48, is introduced into the vacuum chamber 78 via the feedback passage 76. Therefore, the vacuum pressure of the vacuum chamber 78 is set to be approximately the same as the pressure of the pressure regulator port 50. In this arrangement, the upwardly restoring force is applied integrally to the diaphragm 72 and the pair of disk members 96, 98 in accordance with the action of the vacuum pressure introduced into the vacuum chamber 78. The upwardly restoring force for the diaphragm 72 and the pair of disk members 96, 98 is balanced with the spring force of the second spring member 75. Accordingly, the valve plug 58 is seated on the seat section 68 to give the valve-closed state. Thus, the preset desired pressure is supplied to the vacuum pressure-operated apparatus 48 via the pressure regulator port 50.

When any change in pressure occurs due to the intake of the atmospheric air into the vacuum pressure-operated apparatus 48, which is caused, for example, when a workpiece is disengaged from the suction pad after completion of the suction and the transport of the workpiece, then the vacuum pressure on the side of the pressure regulator port 50 is decreased, and the vacuum pressure of the vacuum chamber 78 is also decreased simultaneously. Therefore, the upwardly restoring force, which is applied to the diaphragm 72, is decreased, and the balanced state with respect to the spring force of the second spring member 75 is destroyed, giving a state in which the spring force of the second spring member 75 overcomes the restoring force.

As a result, the diaphragm 72 and the pair of disk members 96, 98 are displaced downwardly in accordance with the action of the spring force of the second spring member 75, and the valve plug 58 is also displaced downwardly integrally with the diaphragm 72. Accordingly, the valve plug 58 is separated from the seat section 68, giving the valve-open state. As a result, the vacuum port 46 is communicated with the pressure regulator port 50 via the communication passage 52, and the vacuum pressure is increased on the side of the pressure regulator port 50. The valve plug 58 maintains the valve-open state until the intake of the atmospheric air is stopped. When the intake of the atmospheric air is stopped, the valve plug 58 is in the valve-closed state.

Subsequently, for example, when the vacuum pressure, which is supplied from the pressure regulator port 50 to the vacuum pressure-operated apparatus 48, is adjusted so that it is decreased (the vacuum pressure is changed toward the atmospheric air), the handle 108 is rotated in a predetermined direction. By doing so, the spring force of the second spring member 75 is decreased in accordance with the rotating action of the handle 108, giving a state in which the upwardly restoring force applied to the diaphragm 72 overcomes the spring force of the second spring member 75. Therefore, the diaphragm 72 and the pair of disk members 96, 98 are displaced upwardly, and thus the communication port 100 is opened. The atmospheric air flows via the communication port 100 from the atmospheric chamber 82 into the vacuum chamber 78. As a result, the atmospheric air is drawn into the vacuum chamber 78, and thus the vacuum pressure of the vacuum chamber 78 is decreased. Simultaneously, the vacuum pressure is also decreased at the pressure regulator port 50 to which the vacuum pressure of the vacuum chamber 78 is supplied via the feedback passage 76. As described above, the communication port 100 is closed at the point of time at which the new spring force of the second spring member 75 changed by the rotating action of the handle 108 is balanced again with the upwardly restoring force applied to the diaphragm 72. The reset vacuum pressure is supplied via the pressure regulator port 50 to the vacuum pressure-operated apparatus 48.

Figure 3:
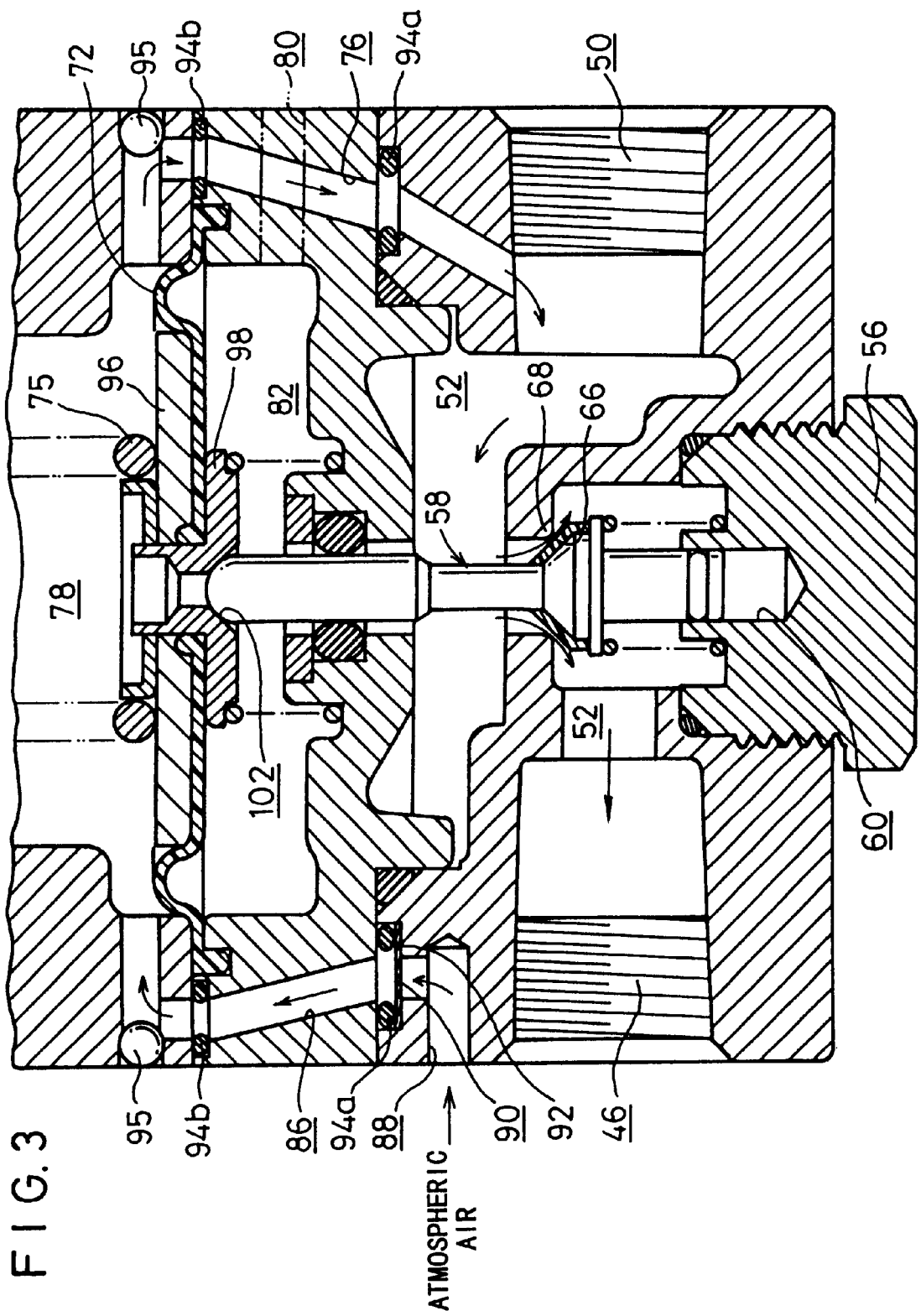
FIG. 3 shows the operation to illustrate a state in which a minute amount of air is drawn and introduced into a vacuum port, for example, via the bleed passage and a feedback passage.
Figure 4:
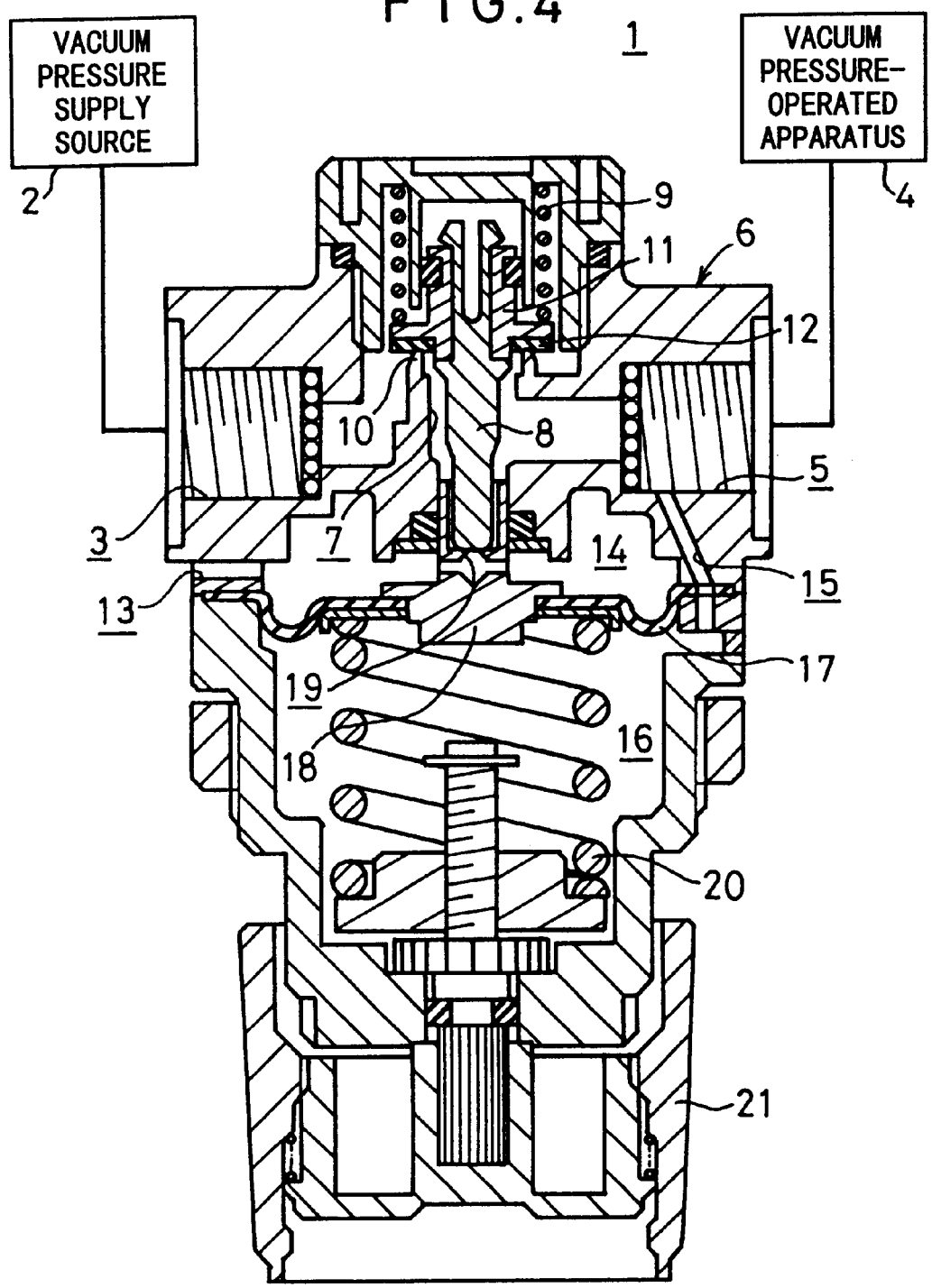
FIG. 4 shows a vertical sectional view taken in an axial direction illustrating a vacuum regulator concerning the conventional technique.

When the valve plug 58 is in the valve-closed state, the atmospheric air drawn from the atmospheric port 88 behaves as shown by the arrows in FIG. 3. That is, the flow amount of the atmospheric air is throttled to be a minute amount by means of the bleed hole 90 of the throttle member 92 which is provided in the bleed passage 86. After that, the atmospheric air is introduced into the vacuum chamber 78 which communicates with the bleed passage 86. Further, the atmospheric air passes through the feedback passage 76, and it is supplied to the pressure regulator port 50. The minute amount of air (atmospheric air) further passes through a minute clearance between the seat section 68 and the valve plug 58 in the valve-closed state seated on the seat section 68, and it is drawn toward the vacuum port 46.

As described above, even when the valve plug 58 is in the valve-closed state, the minute amount of air is always drawn toward the vacuum port 46 via the valve plug 58 which is seated on the seat section 68. Accordingly, the minute clearance is formed between the seat section 68 and the seal member 66 of the valve plug 58. The minute clearance prevents the seal member 66 of the valve plug 58 from biting into the seat section 68.

In other words, the vacuum regulator 30 is operated such that the spring force of the second spring member 75 is balanced with the upwardly restoring force applied to the diaphragm 72 in accordance with the action of the vacuum pressure in the vacuum chamber 78. Accordingly, the vacuum regulator 30 has the function to retain the vacuum pressure at the set pressure. Therefore, the air, which is always drawn through the atmospheric port 88, releases and passes through the space between the seat section 68 and the seal member 66 of the valve plug 58. Thus, the minute clearance is formed between the seal member 66 and the seat section 68. The seal member 66 is prevented from biting into the seat section 68.

Therefore, in the embodiment of the present invention, it is unnecessary to slightly displace the valve plug 58 in an amount of the biting of the seal member 66 of the valve plug 58 into the seat section 68. It is possible to decrease the so-called dead zone in which the vacuum pressure is not changed as in the conventional technique.

The valve-closed state can be instantaneously switched to the valve-open state. Thus, it is possible to improve the response speed.

As a result, in the embodiment of the present invention, the response sensitivity can be enhanced as compared with the vacuum regulator 1 concerning the conventional technique.

Further, in the embodiment of the present invention, when a predetermined vacuum pressure is finely adjusted and it is reset to another vacuum pressure, then the setting accuracy of the reset vacuum pressure is improved, and the setting operation can be conveniently performed, owing to the decrease in the dead zone.

What is claimed is:

1. A vacuum pressure-adjusting apparatus for supplying an adjusted predetermined vacuum pressure to a fluid pressure-operated apparatus to be operated by said vacuum pressure, said vacuum pressure-adjusting apparatus comprising:

a housing including a vacuum port to be connected to a vacuum pressure supply source, a pressure regulator port to be connected to said fluid pressure-operated apparatus, and an atmospheric port to make communication with atmospheric air;

a vacuum chamber closed by a diaphragm;

an operating section including a handle provided rotatably at one end in an axial direction of said housing, for setting a predetermined vacuum pressure in accordance with a rotating action of said handle;

a valve plug provided displaceably in said axial direction in said housing, for seating on a seat section to thereby block communication between said vacuum port and said pressure regulator port; and an air-drawing mechanism for drawing air introduced from said atmospheric port into said vacuum chamber and, after passing through said vacuum chamber, from said pressure regulator port toward said vacuum port via a minute clearance between said seat section and said valve plug while said valve plug is seated on said seat section, wherein said minute clearance prevents said valve plug while seated on said seat section from biting into said seat section.

2. The vacuum pressure-adjusting apparatus according to claim 1, wherein said air-drawing mechanism includes a bleed passage for introducing said air introduced from said atmospheric port into a said vacuum chamber closed by said diaphragm, and a feedback passage for introducing said air introduced into said vacuum chamber into said pressure regulator port, and said air, which is introduced into said pressure regulator port via said feedback passage, is drawn toward said vacuum port via a clearance between said seat in section and said valve plug in a valve-closed state.

3. The vacuum pressure-adjusting apparatus according to claim 1, wherein said air-drawing mechanism includes a throttle member formed with a throttle hole for throttling a flow rate of said drawn air to give a minute amount.

4. The vacuum pressure-adjusting apparatus according to claim 3, wherein said throttle member is arranged in a bleed passage for introducing said air introduced from said atmospheric port into a vacuum chamber closed by said diaphragm.

5. The vacuum pressure-adjusting apparatus according to claim 2, wherein said diaphragm is interposed between a bonnet and a body section for constructing said housing, and an internal space closed at the inside of said housing is formed and comparted by said diaphragm into said vacuum chamber and an atmospheric chamber.

6. The vacuum pressure-adjusting apparatus according to claim 5, wherein said diaphragm is provided with a pair of disk members for interposing a substantially central portion of said diaphragm between one side surface side and the other side surface side, and said disk member is formed with a communication port for making communication between said vacuum chamber and said atmospheric chamber.

7. The vacuum pressure-adjusting apparatus according to claim 6, wherein said communication port is opened and closed by one end of said valve plug which is displaceable in said axial direction in said housing.

* * * * *